United States Patent [19]

Hamada et al.

[11] Patent Number: 4,938,729
[45] Date of Patent: Jul. 3, 1990

[54] DAMPER DISK OF A RUBBER-SERIES TYPE

[75] Inventors: Tooru Hamada, Takatsuki; Yoshio Nishimura, Neyagawa; Syogo Ohga, Osaka, all of Japan

[73] Assignee: Kabushiki Kaisha Daikin Seisakusho, Osaka, Japan

[21] Appl. No.: 184,638

[22] PCT Filed: Aug. 5, 1987

[86] PCT No.: PCT/JP87/00587
§ 371 Date: Apr. 8, 1988
§ 102(e) Date: Apr. 8, 1988

[87] PCT Pub. No.: WO88/01354
PCT Pub. Date: Feb. 25, 1988

[30] Foreign Application Priority Data

Aug. 12, 1986 [JP] Japan .................................. 61-188944
Aug. 12, 1986 [JP] Japan .................................. 61-123616

[51] Int. Cl.⁵ .............................................. F16D 13/64
[52] U.S. Cl. ...................................... 464/85; 192/106.1
[58] Field of Search ................. 192/106.1; 464/66, 68, 464/85

[56] References Cited

U.S. PATENT DOCUMENTS 2,964,930 12/1960 Aira et al. ............................... 464/85
4,601,677 7/1986 Takeuchi ........................... 464/85 X

FOREIGN PATENT DOCUMENTS 45-31951 12/1970 Japan .
46-5697 3/1971 Japan .
58-65346 4/1983 Japan ..................................... 464/85
58-41382 9/1983 Japan .
58-87448 12/1984 Japan .

Primary Examiner—Daniel P. Stodola
Attorney, Agent, or Firm—Armstrong, Nikaido, Marmelstein, Kubovcik & Murray

[57] ABSTRACT

A damper disk of a rubber-series type including elastic members made from rubber, in which second arms are provided with support members made from elastic material having a high rigidity and operable to increase the pushing force transmitting area from the second arms to the elastic members. Rubber sheets are provided between the second arms and the elastic members and the end surfaces of the support members, being of enlarged area, prevent deformation of the rubber sheets.

4 Claims, 3 Drawing Sheets

DAMPER DISK OF A RUBBER-SERIES TYPE

(Applicable Field)

The present invention relates to an improvement of a damper disk of a rubber-series type using elastic members made from rubber.

(Background Art)

The applicant has already developed a clutch disc shown in FIG. 4 and has filed an application for it as Japanese Utility Model Application 58-87448 and published Dec. 19, 1984 as Patent Publication 59-191426.

In FIG. 4, a spline hub 10 is provided with at least two radial first arms 12, 12a, and cylindrical rubbers 18 are disposed between the first arms 12, 12a and retainer plates 14, 14a with rubber sheets therebetween, respectively.

In FIG. 4a illustrating a section taken along line a—a in FIG. 4, when the cylindrical rubbers 18 are compressed, the retainer plates 14, 14a having relatively small thickness of t compress the rubber sheets 16 and the cylindrical rubbers 18, so that the rubber sheets 16 largely deflect and bend as shown at image line in the figure, and in a extreme case, they may break.

(DISCLOSURE OF INVENTION)

It is an object of the invention to provide a damper disk of a rubber-series type, overcoming the above problems, in which it is possible to prevent large deflection of sheets which transmit compression force to elastic members made from rubber.

(STRUCTURE OF INVENTION)

(1) Technical Means

According to the invention, a damper disk of a rubber-series type includes a spline hub continuously provided with a radial hub flange in which at least two first arms are formed, two side plates disposed at opposite sides of the hub flange, retainer plates disposed between the hub flange and the side plates and including second arms faced to the first arms, and elastic members made from rubber and disposed between the both arms and in openings formed in the side plates; and is characterized in that the second arms of the retainer plates are provided with support members made from elastic material having a high rigidity and operable to increase pushing force transmitting area from the second arms to the elastic members, and end surfaces of the support members facing to the elastic members are projected by predetermined distance in directions of the rubber members beyond the end surfaces of the second arms facing to the elastic members.

(2) Operation

The end surfaces of the support members having large area transmit a compression force to the elastic members of the rubber prior to the end surfaces of the second arms, so that the rubber sheets are prevented from deflection.

Torsional characteristics at an initial stage is adjusted by the elasticity of the support members itself.

(Best Mode for Carrying Out the Invention)

(1) First embodiment

Figure 1:
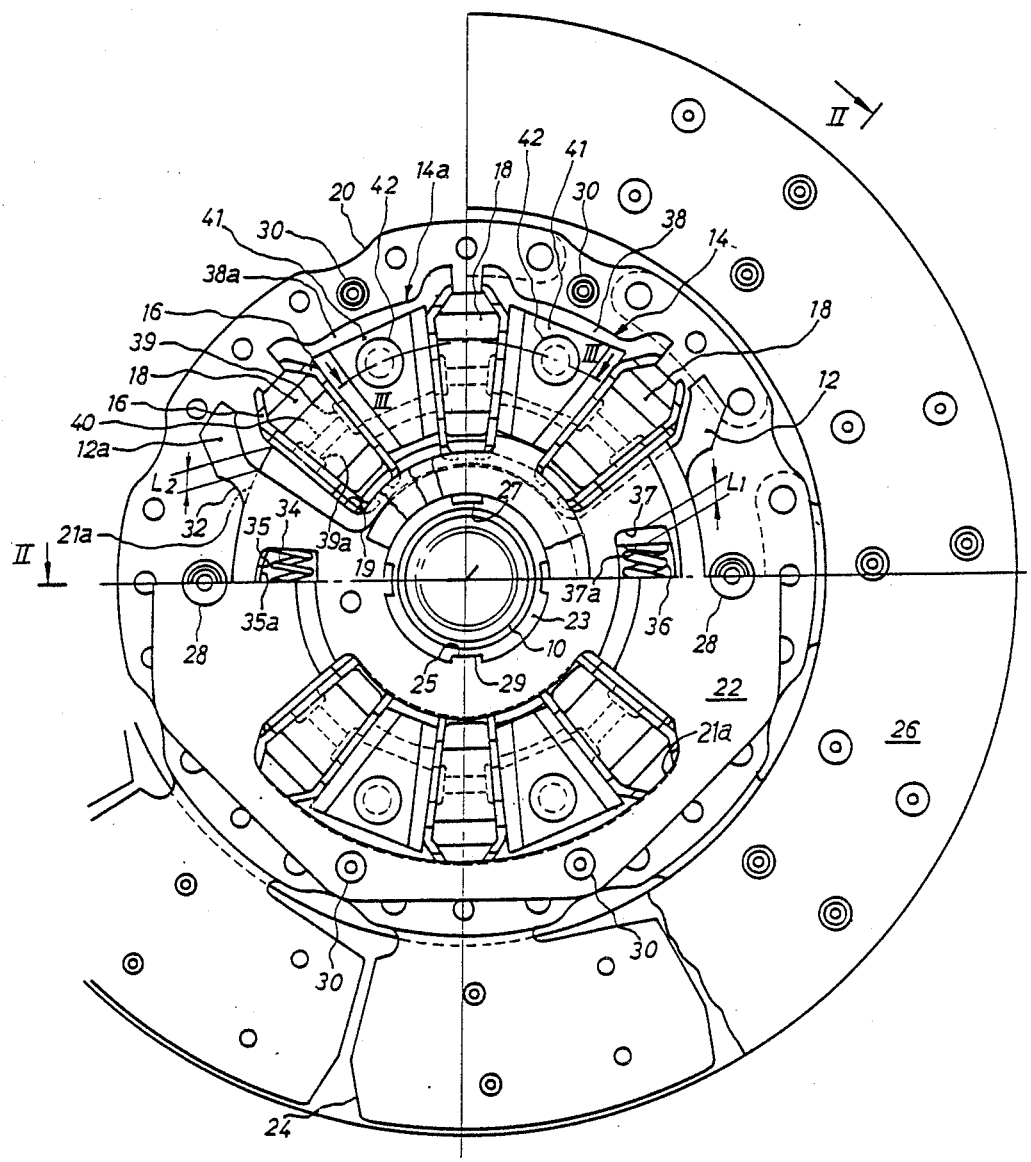
FIG. 1 is a plane view of a clutch disk employing a first embodiment of the invention.
Figure 4A:
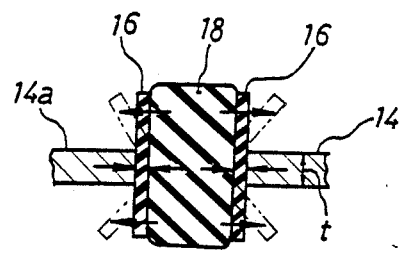
FIG. 4a is a sectional view taken along line a—a in FIG. 4.
Figure 4:
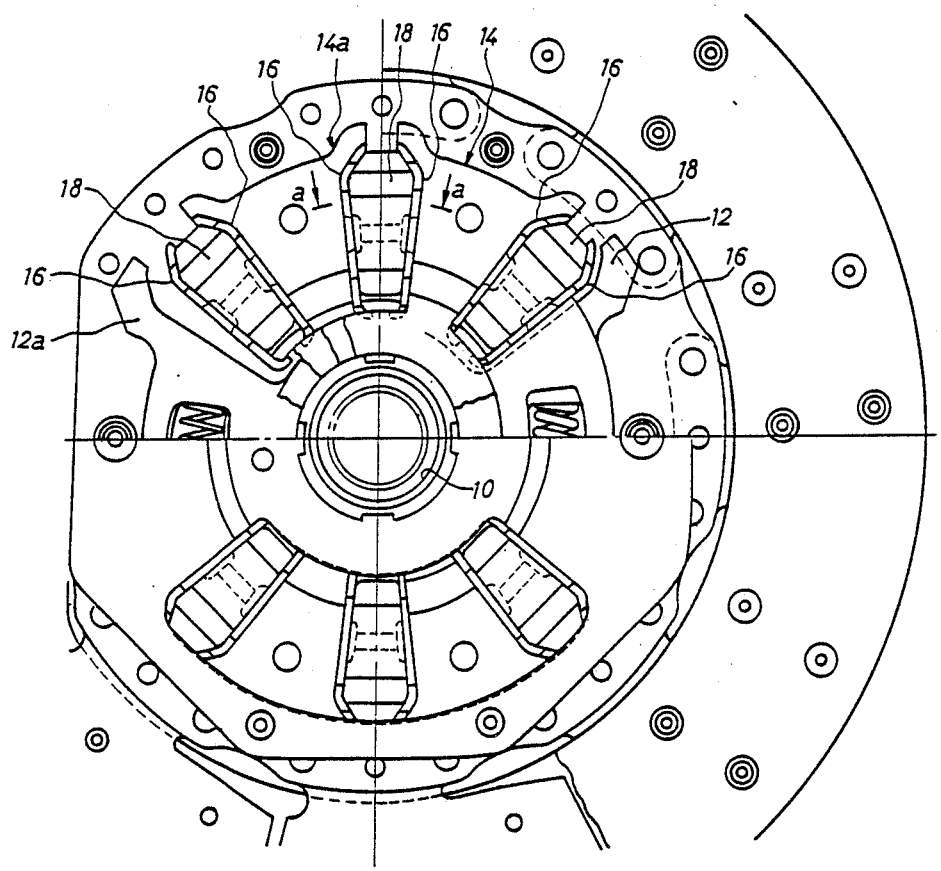
FIG. 4 is a plane view illustrating the prior art of my Japanese Publication 59-191426.

In FIG. 1 illustrating a clutch disk for an automobile in which the invention is employed, portions same as or corresponding to those in FIG. 4 bear same reference numerals.

Figure 2:
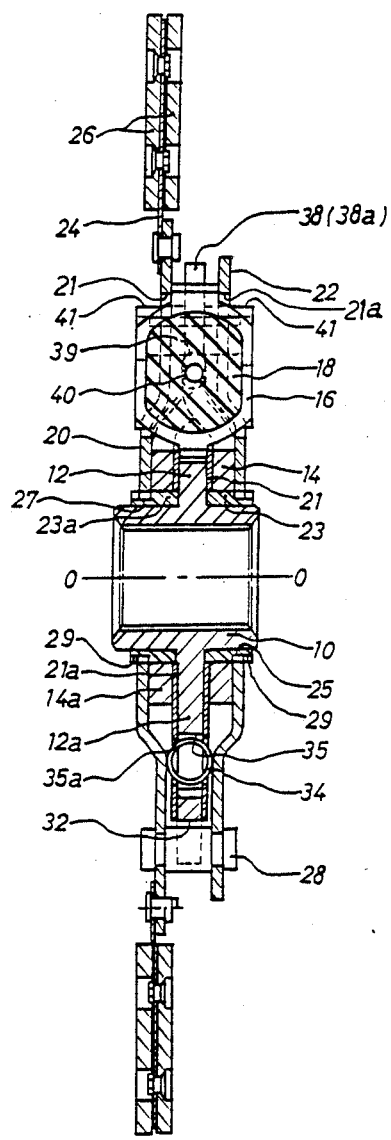
FIG. 2 is a sectional view taken along line II—II in FIG. 1.

In FIG. 2 illustrating a section taken along line II—II in FIG. 1, a spline hub 10 is splined to an output shaft (i.e., input shaft of a transmission), shown only by a center line O—O, and is continuously provided with first arms 12, 12a which extend radially outwardly therefrom to form a hub flange. Side plates, i.e., a clutch plate 20 and a retaining plate 22, which are located at opposite sides of the arms 12, 12a with predetermined axial spaces therebetween, are rotatably disposed around the hub 10. The outer peripheral portion of the clutch plate 20 is fixed to a friction facing 26 by means of cushioning plates 24.

At the right portion in the figure, the retainer plate 14 and a sub plate 21 are pinched between the first arm 12, the clutch plate 20 and the retaining plate 22, and in the left portion, a retainer plate 14a and sub plate 21a are pinched between them (2, 20, 21). Nearly annular bushings 23, 23a are interposed between the inner peripheries of these plates and the hub 10, and the clutch plate 20 and the retaining plates 22 are provided with circumferentially spaced four projections 25, 27, which are fitted into hollows 29 formed in the bushings 23, 23a to connect the plates to the bushings, respectively.

The clutch plate 20 and the retaining plate 22 are fixed together by circumferentially spaced two stop pins 28 and four support pins 30 (FIG. 1). The stop pins 28 are circumferentially movably fitted in recesses 32 formed at the outer peripheral surfaces of the first arms 12, 12a.

At 34 is indicated a relatively weak first spring which is compressively disposed between a window 35 in the first arm 12a and the windows in the sub plates 21, 21a. The windows 35, 35a for the first spring 34 have radial end surfaces which are, as shown in FIG. 1, registered to each other, so that the first torsion spring 34 may be compressed at a region of a torsion angle of 0 or more degrees.

A second torsion spring 36, which is stronger than the first spring 34, is circumferentially spaced by nearly 180 degrees to the first spring 34. The second spring 36 is disposed between the window 37 in the first arm 12a and the windows 37a in the sub plates 21, 21a. A space L1 is formed between the radial end surfaces of the windows 37, 37a.

Thus, after the first arm 12a is twisted to turn the space L1, the second spring 36 starts to be compressed. The inner peripheral portions of said retainer plates 14, 14a are, as shown in FIG. 2, axially spaced with the first arms 12, 12a therebetween, and are axially inwardly curved as the positions thereof changes in the radially outward direction, so that they may overlap the first arms 12, 12a in the circumferential direction (perpendicular to the sheet of FIG. 2).

The outer peripheral portions of the retainer plates 14, 14a are, as shown in FIG. 1, diverged into nearly partial circular shapes to form second arms 38, 38a which are faced to the first arms 12, 12a, respectively. Circumferentially spaced six cylindrical rubbers 18 (elastic members) are disposed between the first arms 12, 12a and the second arms 38, 38a and between the second arm 38 and 38a with rubber sheets 16 therebetween.

The rubber sheets 16 are provided at central portions thereof with projections 39, which are fitted into hollows 39a in the cylindrical rubbers 18 to connect them together. The cylindrical rubbers 18 have central penetration apertures 40.

The sub plates 21, 21a are provided with recesses 19, in which the rubber sheets 16 and the cylindrical rubbers 18 are disposed, and spaces L2 are formed between the end surfaces of the recesses 19 and the end surfaces of the first arms 12a. The space L2 is wider than said space L1, so that the second spring 36 is compressed before the rubbers 18 start to be compressed.

Figure 3:
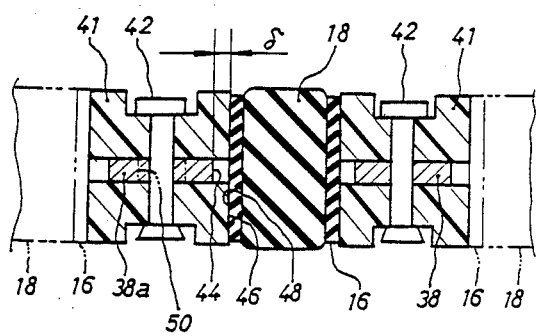
FIG. 3 is a sectional view taken along line III—III in FIG. 1.

Support members 41, which are summary of the invention, are fixed by rivets 42 to the second arms 38, 38a. As shown in FIG. 3 illustrating a section taken along line III—III in FIG. 1, each support member 41 has a nearly rectangular section with a hollow at one side. Spaces δ, which will be detailed later, are formed between end surfaces 44 of the second arms 38, 38a and end surfaces 46 of the support members 41. These support members 41 are made from elastic material having high rigidity, such as nylon resin. Therefore, the support members 41 are deformable in a region of the space δ which exhibiting a large elastic force.

Figure 3A:
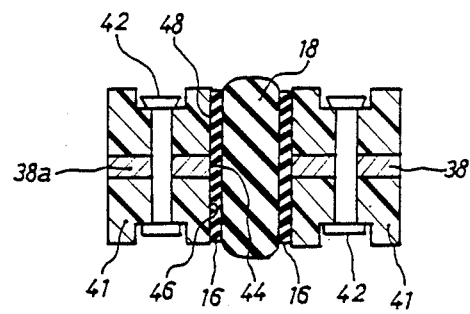
FIG. 3a is fragmentary sectional view illustrating a fully compressed cylindrical rubber.

The length of each space δ is so determined that the end surfaces 44, 46 may form a single plane, as shown in FIG. 3a, and thus, may push end surfaces 48 of the rubber sheets 16 through the whole area by a substantially uniform pressure.

Thus, when the spaces δ, which decrease as the torsion angle increases, is formed between the end surfaces 44 and 46, the elastic force from the cylindrical rubbers 18 is transmitted through the support members 41 having said elastic force to the first arms 12, 12a, and any unpreferable torsional force is not applied to the retainer plates 14, 14a from which the circumferentially spaced second arms 38, 38a of partially circular shape are partially cut and bent. Thus, the opposite end surface of each support member 41 is connected to the first arm 12 or 12a successively through the adjacent rubber sheet 16, the cylindrical rubber, the rubber sheet 16 and the support member 41.

A pair of the support members 41 are disposed on the upper and lower surfaces, in FIG. 3, of each of the second arms 38, 38a and are fixed thereto by one rivet 42.

The cylindrical rubbers 18, the support members 41 and others described above are disposed in the openings 21, 21a in the clutch plate 20 and the retaining plate 22, as shown in FIG. 1.

Although the rivets 42 are fixed to the support members 41 and the second arms 38, 38a, they may be inserted, as shown at image line in FIG. 3, into apertures 50 having diameters larger than those of the rivets 42 formed in the second arms 38, 38a so as to more securely prevent the transmission of the torsion torque from the support members 41 to the second arms 38, 38a.

An operation is as follows. In the clutch disk described above, when power of the engine is introduced from the friction facing 26, the torsion in the circumferential direction of the clutch occurs between the first arms 12, 12a connected to the spline hub 10 and the clutch plate 20 and retaining plate 22. When the torsion angle is relatively small, the first spring 34 is initially compressed to produce a small torsion torque.

When the torsion angle increases and the sub plates 21, 21a turn by an angle corresponding to the space L1 in FIG. 1, the second spring 36 starts to be compressed, so that the spring force of the second spring 36 is added to that of the first spring 34 to produce a large torsion torque.

When the torsion angle further increases to a value corresponding to the space L2, the cylindrical rubbers 18 start to be compressed to produce the torsion torque through a wide torsion angle region.

As described above, when the cylindrical rubbers 18 are compressed, as shown in FIG. 3, the end surfaces 48 of the rubber sheets 16 receive the pushing force from the end surfaces 46 which closely contact through the area remarkably larger than that in conventional case in FIG. 4, to compress the cylindrical rubbers 18. Therefore, the pressure on the surfaces 48 are remarkably reduced as compared with the conventional case in FIG. 4, so that the large deformation of the rubber sheets 16 by the second arms 38, 38a, which may be caused in the conventional case, is prevented.

While the space δ shown in FIG. 3 remains between the end surfaces 44 and 46 in the course of the compression of the cylindrical rubbers 18, the torsion torque is transmitted from the support members 41 to the first arms 12, 12a and the unpreferable torsion force is not transmitted to the second arms 38, 38a.

At the condition in FIG. 3a, in which the cylindrical rubbers 18 are fully compressed, each of them deflects through the distance corresponding to the space δ, and the both end surfaces 44 and 46 form substantially same planes, respectively, and are substantially entirely pressed onto the end surfaces 48 of the rubber sheets 16. Therefore, the pushing force transmission area further increases as compared with the condition in FIG. 3.

(2) Second Embodiment

Figure 3B:
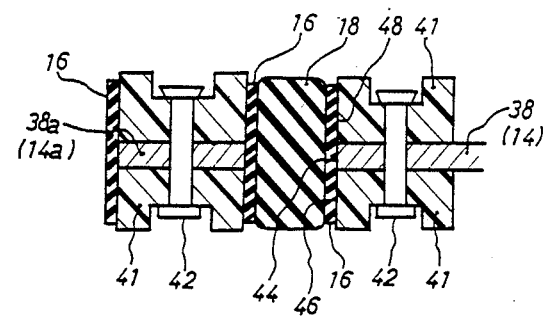
FIG. 3b is a fragmentary sectional view illustrating a second embodiment of the invention.

In FIG. 3b illustrating the second embodiment of the invention and corresponding to the section taken along line III—III in FIG. 1, structures except for those in FIG. 3b are nearly same as the first embodiment.

In FIG. 3b, the support members 41 are arranged on both of the upper and lower surfaces, in FIG. 3, of each of the second arms 38, 38a and are fixed by the one rivet 42 thereto. Therefore, the end surfaces 48 of the rubber sheets 16 are compressed by the end surfaces 44 and 46 which form same planes, respectively.

In the structures in FIG. 3b, when the cylindrical rubbers 18 are compressed, the end surfaces 48 of the rubber sheets 16 receive the pushing force from the end surfaces 44 and 46 which closely contact them through the substantially whole area thereof. Therefore, the pressure of the end surfaces 48 is remarkably reduced as compared with the conventional case in FIG. 4a, so that the large deformation of the rubber sheets 16 by the second arms 38, 38a, which may be caused in the conventional case, is prevented.

(EFFECT OF THE INVENTION)

In the damper disk of the rubber-series type according to the invention, as described above, the second arms 38, 38a of the retainer plates 14, 14a are provided with the support members 41 which are made from the elastic material having the high rigidity and increase the pushing force transmission area to the rubber sheets 16 and the cylindrical rubbers 18 (elastic members) from the second arms 38, 38a, and the spaces δ are formed between the end surfaces 44 of the second arms 38, 38a facing to the rubber sheets 16 and the cylindrical rubbers 18 and the end surfaces 46 of the support members 41 facing to the rubber sheets 16 and the cylindrical rubbers 18. Therefore, the pressure of the end surfaces 48 is remarkably reduced as compared with the conventional case in FIG. 4a, so that the large deformation of the rubber sheets 16 by the pushing force from the second arms 38, 38a, which may be caused in the conventional case, is prevented, which results in improvement of the durability of the rubber sheets 16.

Therefore, the durability and reliability is improved in the clutch disk of the rubber-series type, in which the compression force is transmitted by the relatively thin first arms 12, 12a and the second arms 38, 38a to the cylindrical rubbers 18 and the rubber sheets 16 having the large sectional area.

(OTHER EMBODIMENTS)

(1) The present invention can be applied not only to the clutch disk described above but also to damper disks for torque converters.

(2) The support members 41 are made not only from the nylon but also from other elastic material having high rigidity such as hard nitrile rubber.

We claim:

1. A damper disc of a rubber-series type including a spline hub continuously provided with a radial hub flange in which at least two first arms are formed, two side plates disposed at opposite sides of the hub flange, retainer plates disposed between the hub flange and the side plates and including second arms faced to said first arms, and elastic members made from rubber and disposed between said both arms and in openings formed in said side plates; characterized in that the second arms of the retainer plates are provided with support members fixed to each respective second arm by one rivet and made from elastic resin material for increasing pushing force transmitting area from the second arms to the elastic members, and end surfaces of the support members facing to the elastic members and projected by predetermined distances in the direction of the rubber members beyond the end surfaces of the second arms facing to the elastic members, said end surfaces of said second arms, in the circumferential direction of said damper disk when said elastic members are not compressed, being spaced from said facing elastic member.

2. A damper disk of a rubber-series type including a spline hub continuously provided with a radial hub flange in which at least two first arms are formed, two side plates disposed at opposite sides of the hub flange, retainer plates disposed between the hub flange and the side plates and including second arms faced to said first arms and elastic members made from rubber and disposed between said both arms and in openings formed in said side plates; characterized in that the second arms of the retainer plates are provided with support members fixed to each respective second arm by one rivet and made from elastic resin material for increasing pushing force transmitting area from the second arms to the elastic members, end surfaces of the support members facing to the elastic members are registered with the end surfaces of the second arms facing to the elastic members.

3. A damper disk of a rubber-series type including a spline hub (10) continuously provided with a radial hub flange in which at least two arms (12, 12a) are formed, two side plates (20, 22) disposed at opposite sides of the hub flange, retainer plates disposed between the hub flange and the side plates (20, 22) and including second arms (38, 38a) faced to said first arms (12, 12a), and elastic members (18) made from rubber and disposed between said both arms and in openings formed in said side plates (20, 22); characterized in that the second arms (38, 38a) of the retainer plates are provided with support members (41) made from elastic resin material for increasing pushing force transmitting areas from the second arms (38, 38a) to the elastic members (18), end surfaces of the support members (41) facing to the elastic members (18) are projected by predetermined values in directions of the rubber members beyond the end surfaces of the second arms (38, 38a) facing to the elastic members (18), the opposite end surfaces of the rubber members (18) are provided with rubber sheets (16), projections formed at central portions of the rubber sheets (16) are fitted into hollows of the rubber members (18) to connect the rubber members (18) to the rubber sheets (16), the support members (41) are provided at opposite surfaces of the second arms (38, 38a) and are fitted thereto by one rivet, the spaces between the end surfaces of the support members (41) and the end surfaces of the second arms (38, 38a) are so determined that both of the end surfaces may form substantially same planes, respectively, due to the compression of the support members when the elastic members (18) are fully compressed, two sub plates are rotatably arranged with respect to the first arms (12, 12a) with the first arms (12, 12a) therebetween, first and second torsion springs which operate at a low torsion angle region are disposed between openings in the first arms and the openings in both of the sub plates, a narrow space is formed between the end surfaces of the openings in the sub plate and the openings in the first arms (12, 12a) in which the second torsion spring is arranged, the rubber members (18) and the rubber sheets (16) are disposed in recesses in the sub plates (16), and a wide space is formed between the end surfaces of the recesses and of the first arms (12, 12a).

4. A damper disk of the rubber-series type including a spline hub (10) continuously provided with a radial hub flange in which at least two first arms (12, 12a) are formed, two side plates (20, 22) disposed at opposite sides of the hub flange, retainer plates disposed between the hub flange and the side plates (20, 22) and including second arms (38, 38a) faced to said first arms (12, 12a), and elastic members (18) made from rubber and disposed between said both arms and in openings formed in said side plates (20, 22); characterized in that the second arms (38, 38a) of the retainer plates are provided with support members (41) made from elastic material having a high rigidity and operable to increase pushing force transmitting area from the second arms (38, 38a) to the elastic members (18), end surfaces of the support members (41) facing to the elastic members (18) are registered with the end surfaces of the second arms (38, 38a) facing to the elastic members (18), the opposite end surfaces of the rubber members (18) are provided with rubber sheets (16), projections formed at central portions of the rubber sheets (16) are fitted into hollows of the rubber members (18) to connect the rubber members (18) to the rubber sheets (16), the support members are provided at opposite surfaces of the second arms (38, 38a) and are fixed thereto by one rivet, two sub plates are rotatably arranged with respect to the first arms (12, 12a) with the first arms (12, 12a) therebetween, first and second torsion springs which operate at a low torsion angle region are disposed between openings in the first arms and the openings in both of the sub plates, a narrow space is formed between the end surfaces of the openings in the sub plate and of the openings in the first arms (12, 12a) in which the second torsion spring is arranged, the rubber members (18) and the rubber sheets (16) are disposed in recesses in the sub plate (16), and a wide space is formed between the end surfaces of the recesses and of the first arms (12, 12a).

* * * * *